United States Patent [19]

Belgard

[11] 4,456,027
[45] Jun. 26, 1984

[54] HOSE BIB COVER

[76] Inventor: Truly M. Belgard, P.O. Box 9031, Ft. Worth, Tex. 76107

[21] Appl. No.: 398,837

[22] Filed: Jul. 16, 1982

[51] Int. Cl.³ ............................................. F16K 51/00
[52] U.S. Cl. .................................... 137/375; 24/301; 137/382
[58] Field of Search ................... 137/375, 381, 382; 24/300, 301

[56] References Cited

U.S. PATENT DOCUMENTS

| 2,650,180 | 8/1953 | Walker | 137/375 |
| 2,686,530 | 8/1954 | Dire | 137/382 |
| 4,111,132 | 9/1978 | Plut | 24/301 |
| 4,244,394 | 1/1981 | Hartselle | 137/375 |

Primary Examiner—Martin P. Schwadron
Assistant Examiner—Sheri Novack
Attorney, Agent, or Firm—Harvey B. Jacobson

[57] ABSTRACT

An open-sided housing constructed of heat insulative material is provided and includes a resilient and compressible seal strip extending about the wall portions of the housing defining the open side thereof. The central portion of the closed side of the housing opposite the open side thereof includes anchor structure and a pair of elastic tension member structures are provided and have one set of corresponding ends anchored relative to the anchor structure and include means at the other pair of corresponding ends thereof for releasable engagement with selected portions of an associated hose bib. The open side of the housing is placed over the exposed portions of the hose bib with the seal strip equipped open side of the housing opposing the outer wall surface beyond which the hose bib projects and an exteriorly projecting portion of the anchor structure is engaged by one hand of a person installing the cover while the other hand of the person reaches inside the cover and sequentially anchors the elastic tension members to selected portions of the hose bib. Thereafter, the elasticity of the tension members is sufficient to draw the housing into engagement with the wall outer surface and the resilient seal strip forming a fluid-tight seal with the wall. In addition, the seal strip is of a water-absorbing type whereby during cold rainy or snowy weather the seal strip will absorb moisture and be frozen to the exterior wall surface engaged thereby.

3 Claims, 4 Drawing Figures

HOSE BIB COVER

BACKGROUND OF THE INVENTION

Hose bibs which project to the exterior of a building wall are subject to freezing. Accordingly, most conventional hose bibs are equipped with water supply lines therefor including shut-off valves on the inside of the associated wall whereby the supply of water to the hose bib may be shut off during cold weather and the hose bib valve may be opened in order to drain water therefrom. In addition, some hose bibs are constructed such that the valve thereof is spaced inwardly of the associated wall, but these hose bibs are still subject to freezing in extreme cold weather and are more susceptible to breakage as a result of loose mounting of the hose bibs through the associated walls.

Accordingly, a need exists for a cover whereby the exterior portions of a hose bib may be shielded from below freezing exterior temperatures and also constructed in a manner whereby the inherent transfer of heat through the associated wall from the inside thereof to the exterior of the wall may serve to heat the interior of the hose bib cover and thus the hose bib enclosed therein.

BRIEF DESCRIPTION OF THE INVENTION

The hose bib cover comprises an open-sided housing constructed of heat insulative material and including a seal strip extending about the open side of the housing. The housing may be placed over a hose bib projecting outwardly from an exterior wall surface and those portions of the exterior wall surface disposed immediately about the hose bib. The cover serves to protect the hose bib enclosed thereby from sub-freezing exterior temperatures and by constructing the cover in such a manner to also enclose reasonable exterior wall surfaces disposed about the hose bib the inherent transfer of heat from the inside of the wall to the outside thereof results in the area enclosed by the cover about the hose bib being heated.

The main object of this invention is to provide a convenient cover for enclosing a hose bib projecting outwardly from the outer surface of a building wall or the like.

Another object of this invention is to provide a cover which will not only function to protect the enclosed hose bib from the low freezing exterior temperatures, but which will also serve to enable heating of the interior of the cover, and thus the hose bib enclosed thereby, as a result of the inherent transfer of heat through the building wall portion immediately surrounding the water supply pipe for the hose bib.

Still another very important object of this invention is to provide a hose bib cover which may be readily used in conjunction with hose bibs of various different types.

Another object of this invention is to provide a hose bib cover which may be readily applied to an associated hose bib with little effort.

A still further object of this invention is to provide a hose bib cover including exterior wall surface engaging seal structure therefor constructed in a manner whereby the seal structure, during sub-freezing weather, will freeze to the opposing exterior wall surfaces.

A final object of this invnetion to be specifically enumerated herein is to provide a hose bib cover which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
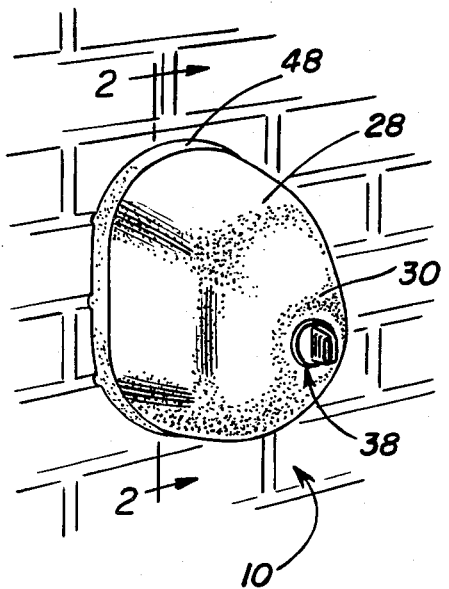
FIG. 1 is a fragmentary perspective view of a building wall portion through which a hose bib projects and with the cover of the instant invention operatively positioned over the hose bib.

Referring now more specifically to the drawings the numeral 10 generally designates a building wall or the like including an outer side surface 12 and an opposite inner side surface (not shown). A water supply pipe 14 extends through a passage 16 formed through the wall 10 and having grout 18 therein disposed about pipe 14.

The outer end of the pipe 14 supports a flanged hose bib assembly 20 of conventional design including a downwardly and outwardly inclined outlet neck 22 and a horizontal valve shaft 24 provided with a handwheel 26 on its outer end.

The cover of the instant invention is referred to in general by the reference numeral 28 and comprises a hollow cup-shaped housing 30 having one open side 32 which is generally oval in shape and includes major and minor transverse axes. The housing 30 is constructed of expanded polystyrene, although other suitable heat-insulating materials may be used, and includes a small plan area outer end wall 34 having a slot 36 formed therethrough. The outer end wall 34 is disposed opposite the open side 32 and the peripheral walls of the housing diverge from the outer end wall 34 toward the open side 32. An anchor structure referred to in general by the reference numeral 38 is supported on the end wall 34 and includes an inner blade portion 40 which extends through the slot 36 and is disposed in a plane generally paralleling the major axis of the open side 32. The anchor structure additionally includes an outwardly projecting finger-engageable tab 42 and a transverse abutment washer defining intermediate portion 44 disposed intermediate the tab 42 and the blade portion 40, the washer defining intermediate portion 44 being abutted against the outer surface of the end wall 34. The inner end of the blade portion 40 includes a pair of opposite edge inclined slots 46 for a purpose to be hereinafter more fully set forth.

The open side 32 of the housing 30 has a resilient sealing strip 48 supported therefrom and constructed of foam rubber. The strip 48 is relatively thick and compressible.

A pair of tension members in the form of elastic rubber bands 50 and 52 are provided and one pair of corresponding ends of the rubber bands 50 and 52 are anchored in the slots 46 and the other pair of ends of the bands 50 and 52 in a tensioned state. Thus, the bands 50 and 52 secure the housing 30 over the outer surface of the wall 12 about the hose bib 20 in a manner such that the seal ring or gasket 48 is at least somewhat compressed and conforms to surface irregularities of the contacted outer surface of the wall 12 in order to form an airtight seal therewith.

Figure 4:
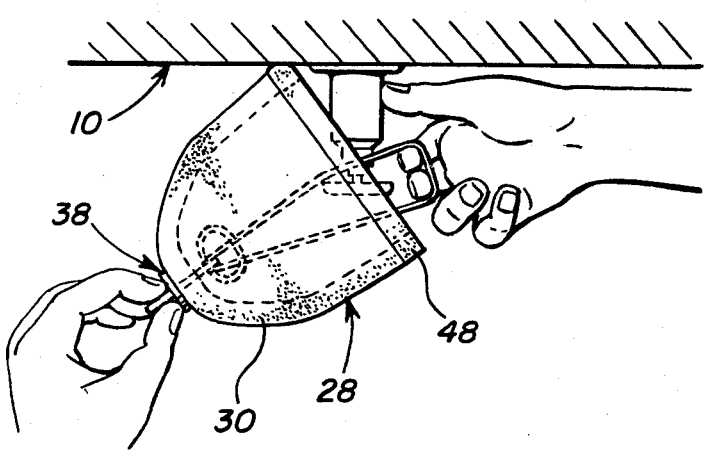
FIG. 4 is a fragmentary plan view of the hose bib cover and the associated hose bib with the cover in a partially installed position over the hose bib.
Figure 3:
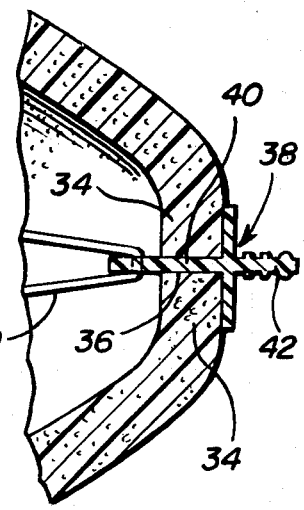
FIG. 3 is a horizontal sectional view taken substantially upon the plane indicated by the section line 3—3 of FIG. 2.
Figure 2:
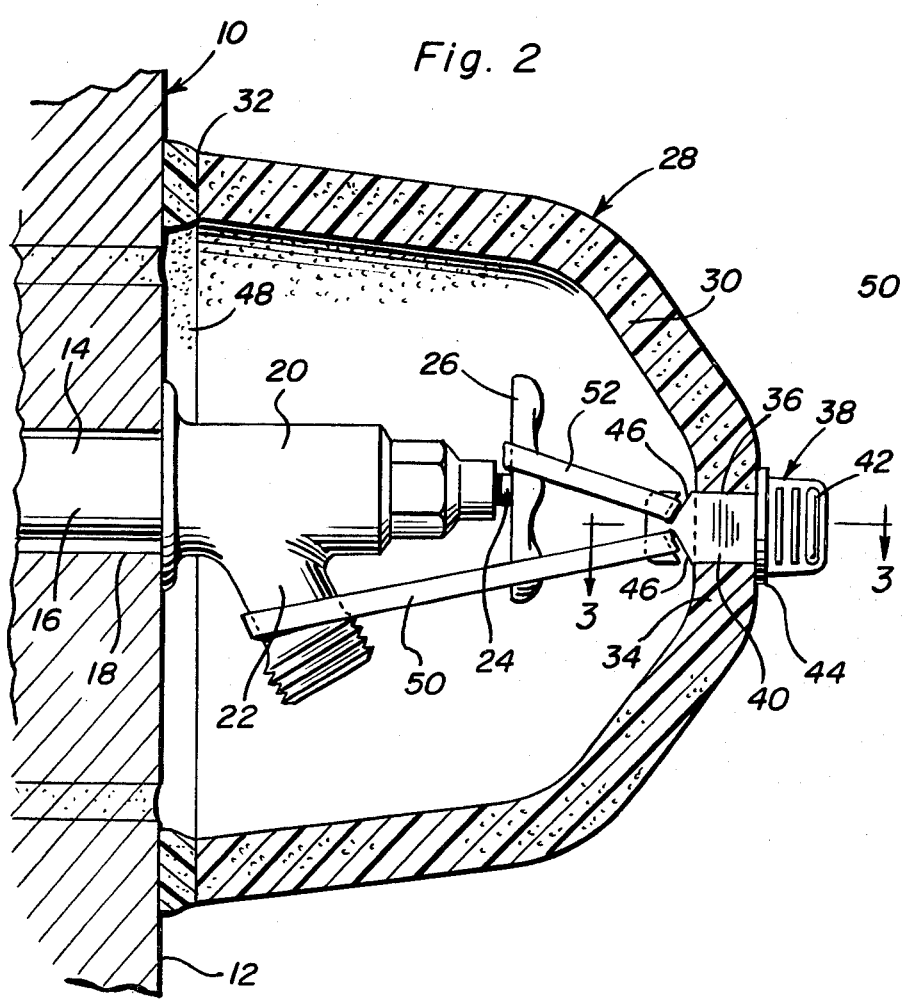
FIG. 2 is an enlarged fragmentary vertical sectional view taken substantially upon the plane indicated by the section line 2—2 of FIG. 1.

In order to install the cover 28 over the hose bib 20, the cover 28 is initially positioned substantially in the manner illustrated in FIG. 4 of the drawings with the tab 42 in one hand while the other hand reaches into the interior of the housing 30 from one side thereof and sequentially grasps the ends of the elastic bands 50 and 52 remote from the slots 46 and engages those ends over the neck 22 and the wheel 26 in the manner illustrated in FIG. 2. Then, the cover 28 may be allowed to assume its final position such as that illustrated in FIGS. 1 and 2 of the drawings.

It will be noted that the cover 28 not only covers the hose bib 20, but also all immediately surrounding portions of the outer surface 12 of the wall 10. In this manner, the cover 28 not only insulates the hose bib 20 from cold ambient temperatures, but also enables the inherent transfer of heat through the wall 10 inthe area thereof horizontally registered with the cover 28 to at least somewhat heat the interior of the cover 28 and thus further ensure against the hose bib 20 freezing in very cold weather. The gasket or seal 48 is constructed of foam rubber of the type which may absorb some water during rainy weather and if the gasket 48 has absorbed some water during above freezing temperatures as soon as the exterior temperatures drop below freezing the water within the gasket 48 will serve to freeze and thus securely fasten gasket 48 to the outer surface 12 of the wall 10. In addition, the elastic bands 50 and 52 are constructed of a suitable rubber or the like especially formulated to withstand cold temperatures. The anchor structure 38 may be constructed of a suitable plastic and it therefore may be seen that the cover 28 may be manufactured at a very low cost.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a building exterior wall having an opening formed therethrough, a water supply pipe extending through said opening and having a hose bib supported upon its outer end equipped with a hand wheel and a laterally directed water outlet neck, a hose bib cover for insulating said hose bib from below freezing exterior temperatures, said cover including an open-sided cup-shaped housing disposed over said hose bib, constructed of heat insulative material and with the open side of said housing opposing the outer surface of said wall, being genrally oval in shape and including major and minor axes, resilient and compressible seal structure extending about said open side, facing outwardly therefrom and abutted against said outer surface, said housing including an outer end wall centered relative to and of a plan area smaller than the cross-sectional area of said open side, said housing further including peripheral walls divergent from said end wall toward said open side, said outer end wall including an elongated blade-type anchor extending therethrough and disposed in a plane generally paralleling said major axis, said anchor including an inner end portion projecting inwardly of said end wall and having opposite side edge slots formed therein spaced inwardly of said end wall and oppositely outwardly inclined toward the latter, said anchor also including an outer end finger grip defining tab portion projecting outwardly of said end wall and an enlarged mid-portion abutted against the outer surface of said end wall, a pair of elastic bands including first corresponding loop portions each anchored in a corresponding slot of said slots and second corresponding loop portions engaged about said hand wheel and outlet neck, said bands being in a tensioned state with said compressible seal structure abutted against the exterior surface of said exterior wall and compressed between the latter and the open side of said housing, the open side of said housing including peripheral wall portions all of which are spaced outward of all portions of said wall horizontally registered with said hose bib.

2. The cover of claim 1 wherein said cover is constructed of expanded plastic.

3. The cover of claim 1 wherein said seal structure is constructed of resilient foam material having water absorbent properties.

* * * * *